United States Patent [19]
Guidicelli

[11] B 3,990,307
[45] Nov. 9, 1976

[54] LIQUID LEVEL MEASURING AND INDICATING APPARATUS

[75] Inventor: Charles Guidicelli, Saint-quen, France

[73] Assignee: Societe Anonyme D.B.A., Paris, France

[22] Filed: Apr. 25, 1974

[21] Appl. No.: 464,290

[44] Published under the second Trial Voluntary Protest Program on February 3, 1976 as document No. B 464,290.

[30] Foreign Application Priority Data
May 22, 1973 France .............................. 73.18497

[52] U.S. Cl. ............................................... 73/302
[51] Int. Cl.² ......................................... G01F 23/16
[58] Field of Search ................... 73/299, 302, 388 R

[56] References Cited
UNITED STATES PATENTS

| | | | |
|---|---|---|---|
| 2,012,511 | 8/1935 | Hubbard | 73/302 X |
| 3,230,769 | 1/1966 | Carver et al. | 73/302 X |
| 3,307,397 | 3/1967 | Brown et al. | 73/302 |
| 3,834,236 | 9/1974 | Durin | 73/302 |

FOREIGN PATENTS OR APPLICATIONS

| | | | |
|---|---|---|---|
| 1,122,273 | 1/1962 | Germany | 73/299 |

Primary Examiner—Richard C. Queisser
Assistant Examiner—John S. Appleman
Attorney, Agent, or Firm—Leo H. McCormick, Jr.; William N. Antonis

[57] ABSTRACT

A level indicator using an indirect method of measuring a gas pressure in order to check the level of a liquid such as the lubricant contained in the crankcase of an internal combustion engine. The level indicator includes preferably a liquid column gas-pressure gauge formed of a straight measuring tube having one end immersed in the barometric liquid contained in a reservoir, and an electrical heating resistance is located in the enclosure of the reservoir above the barometric liquid. The enclosure communicates with a tubular probe immersed in the liquid whose level is to be checked. Voltage applied to the resistance generates heat which as a result of the thermal expansion of the gas causes the gas-pressure in the enclosure to become sufficient for causing the gas to bubble in the liquid, so that the gas-pressure which is read off the pressure gauge is representative of the depth at which the probe is immersed. The pressure gauge can be mounted on the dash-board of a vehicle and, by connecting the heating resistance across the oil pressure warning light of the vehicle, an automatic reading of the oil level is obtained on starting of the internal combustion engine.

3 Claims, 3 Drawing Figures

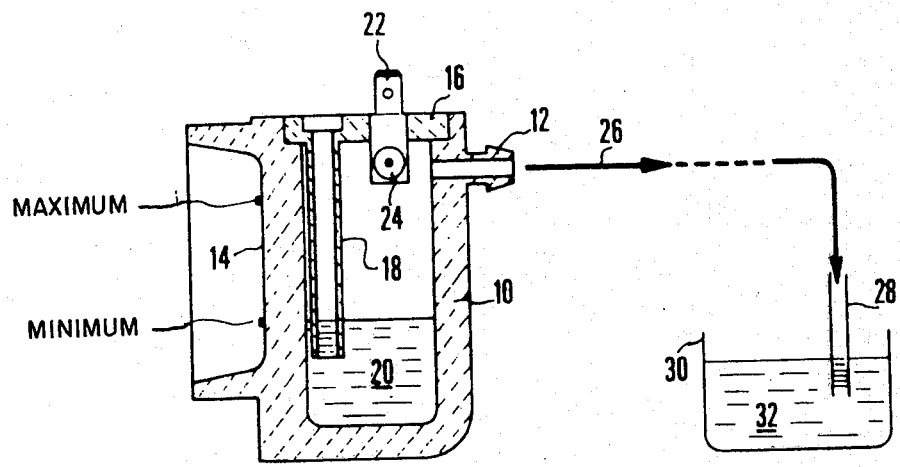
FIG. 1
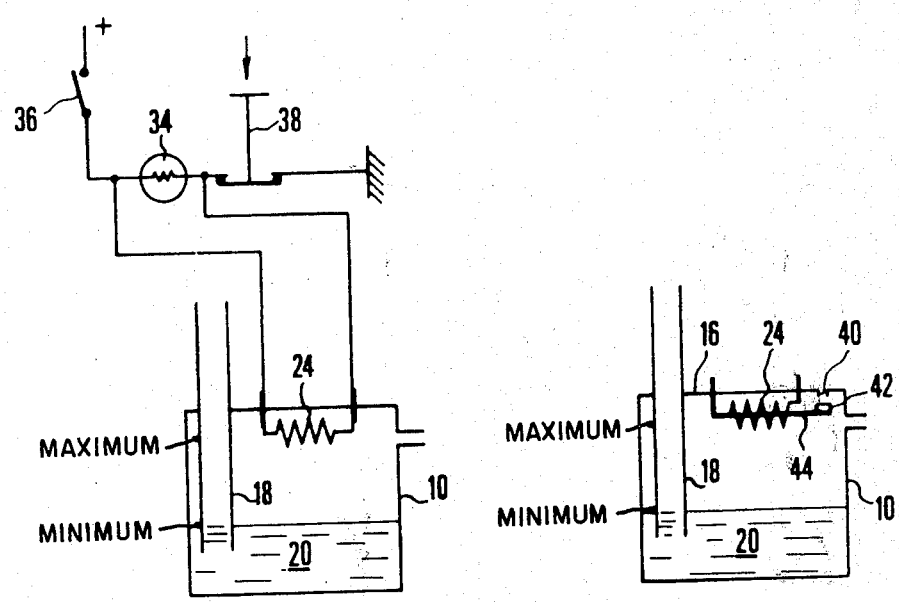
FIG. 2
FIG. 3

LIQUID LEVEL MEASURING AND INDICATING APPARATUS

The invention relates to a level indicator using an indirect method of measuring a gas pressure in order to check the level of a liquid such as the lubricant contained in the crankcase of an internal combustion engine.

Indicators of this type consist essentially of a source of variable gas pressure and a pressure gauge. The gas pressure source is connected both to the pressure gauge and to a tubular probe immersed to a given depth in the liquid whose level is to be checked. When the pressure is sufficiently high to cause the gas to bubble, it is equal to the pressure of the liquid at the depth concerned. The depth is therefore directly proportional to the gas pressure, and the pressure gauge is graduated so that the depth can be read off it directly.

Indicators of this type have been used to verify the oil level in the crankcase of an internal combustion engine, for which purpose the tubular probe is introduced into the crankcase to a depth such that its end reaches the minimum admissible oil level. The pressure gauge, for example a liquid-column pressure gauge, can be mounted on the dashboard of the vehicle, so that the driver can check the level without looking at the engine. These indicators have not been very successful, however, since the variable gas pressure has hitherto been obtained by manual means such as pumps or bulbs, which are relatively expensive and whose operation requires some care.

An object of the invention is to provide a pressure-measuring level indicator in which the variable gas pressure is obtained by low-cost electrical means. In a vehicle, the indicator enables the oil level to be checked automatically.

In a level indicator according to the invention, the source of variable gas pressure comprises a gas-filled sealed enclosure housing an electrical heating resistance having connecting means sealingly extending through the wall of the enclosure, the pressure variation resulting from thermal expansion of the gas enclosed in the enclosure when a voltage is applied to the resistance.

In a preferred embodiment, the pressure gauge is a liquid-column pressure gauge comprising a measuring tube one end of which is exposed to the atmosphere and the other end immersed in a barometric liquid contained in a reservoir, and the enclosure of the indicator is the reservoir of the pressure gauge, this reservoir preferably being of transparent material.

An advantageous method of installing the level indicator consists in connecting the heating resistance in parallel across the oil pressure warning light for an internal combustion engine. This enables the oil level to be checked automatically when the ignition switch is turned on.

The invention will now be described by way of example with reference to the accompanying drawings in which:

FIG. 1 is a cross-sectional view of a level indicator according to a preferred embodiment of the invention;

FIG. 2 illustrates diagrammatically one method of installing the level indicator; and FIG. 3 is a simplified view illustrating a level indicator having a valve for connecting its enclosure with the atmosphere.

In the preferred embodiment illustrated FIG. 1, the level indicator comprises a jar or reservoir 10 of transparent synthetic material having a connecting spigot 12. One side of the tank or reservoir 10 forms a window 14, bearing graduations indicated in the drawings by means of reference mark 11 for minium or "mini" and "maxi". The reservoir 10 is closed by a cover 16, also of transparent synthetic material. A tube 18 cast integrally with the cover 16 is open at both ends. The tube 18 extends downwardly into the reservoir 10 at a space close to from the window 14. Its lower end is slightly below the "mini" mark 11 and is immersed in a barometric liquid 20, the level of which is visible through the tank 10 and coincides with the "mini" mark. Two electrical connecting lugs 22, only one of which is visible in FIG. 1, extend sealingly through the cover 16. Outer portions of the lugs are adapted to be connected to a voltage source (not shown), whereas inner portions of the lugs are connected to a heating resistance 24.

In the operation, a flexible tube 26 connects the spigot 12 of the indicator to a tubular probe 28, which is immersed in the crankcase 30 of an internal combustion engine to a depth such that the bottom end of the probe 28 is flush with or slightly below the minimum admissible level for the oil 32 which lubricates the engine. To check the oil level, the connecting lugs 22 are connected to an external voltage source. The electrical current which then flows through the resistance 24 creates heat energy, which heats the air contained in the reservoir 10. Because the air cannot escape from the reservoir, the thermal expansion of the air gives rise to a pressure increase, which is exerted both on the level of the barometric liquid 20 in the reservoir and on the column of oil in the tubular probe 28. A power consumption of approximately 20 watts in the resistance 24 suffices to make the pressure rise very briskly by a few centimetres of water, to a level high enough to cause the air to bubble into the oil 32 in the crankcase 30. The tube 18 having one end immersed in the liquid 20, forms a pressure gauge responsive to the pressure prevailing in the reservoir 10. If the densities of the liquid 20 in the reservoir and of the oil 32 in the crankcase are the same, the liquid 20 rises in the tube 18 by a distance equal to the immersed depth of the probe 28, to a level representative of the oil level. Since the level of the liquid 20 is visible, the graduations on the window 14 indicate the degree to which the crankcase is filled with oil. When the oil level has been checked, the external voltage source is disconnected, and the air inside the reservoir can be allowed to cool to the ambient temperature. The quantity of air which has escaped and bubbled into the oil can be replaced by way of the tube 18, provided that a short length of this tube is immersed in the liquid 20. Alternatively, the air can be replaced by way of a valve (not shown in FIG. 1) connecting the tank to the atmosphere, this valve being mounted on the reservoir 10 or on its cover 16.

FIG. 2 illustrates diagrammatically one method of installing the level indicator, which permits automatic checking of the oil level on starting of the internal combustion engine. In the arrangement which is used, the heating resistance 24 is connected in parallel with the oil pressure warning light 34, the latter being on the one hand connected to the positive terminal of the battery through the starter switch 36 and on the other hand to the vehicle earth through the switch 38 which is responsive to the oil pressure. The level indicator can be mounted on the dashboard of the vehicle. The measuring pressure enabling the oil level to be read off the tube 18 builds up automatically in the reservoir 10 while the warning light 34 and resistance 24 are both on that is, from the time at which the ignition switch 36 is turned on to the time at which the oil pressure becomes high enough to open the switch 38.

FIG. 3 illustrates diagrammatically a form of valve designed to connect the enclosure of the level indicator 10 to the atmosphere when the indicator is not in use. The valve comprises a valve seat 40 formed on the cover 16 of the reservoir 10, and a closure member 42 attached to a bimetal element 44, the latter being in a heat-exchange relationship with the resistance 24. The closure member 42, which is normally off the seat 40, moves into its closing position, in which it engages this seat, when the bimetal element 44 is deformed by the heat from the resistance 24.

I claim:

1. In a vehicle, a fluid level indicator for checking the corresponding quantity of lubricant in the crankcase of the vehicle, said fluid level indicator comprising:
   a housing having a reservoir therein for retaining a quantity of fluid, said housing being constructed of a transparent material so that the level of said fluid in the reservoir is visible to an operator through a wall therein;
   a liquid column gas-pressure gauge having a straight measuring tube with one end exposed to atmosphere and the other end immersed in said fluid in the reservoir;
   cover means attached to said housing to establish an air filled enclosure above said fluid, said cover means having an opening therein through which air from the atmosphere can freely be communicated;
   conduit means attached to said housing for connecting said air filled enclosure to a probe located in the lubricant in the crankcase;
   valve means associated with said opening in the cover means for sealing said reservoir from the atmosphere; and
   an electrical resistance heating means located in said reservoir and connected to said valve means, said heating means being connected to s source of voltage in parallel with an oil pressure warning light for the vehicle, said voltage being applied to said resistance heating means which will initially operate said valve means to seal said opening and thereafter will generate heat in said reservoir which will cause a thermal expansion of the gases in the sealed enclosure to allow a portion of the gas to escape into the crankcase through said conduit means in opposition to the lubricant therein, said fluid in the reservoir responding to said thermal expansion of the gases by moving in said straight measuring tube to a level corresponding to the opposition of the lubricant to provide an indication of the level of the lubricant in the crankcase, a pressure responsive switch in ciruit with said warning light responding to the development of oil pressure in the vehicle to terminate the transmission of voltage to the resistance heating means to permit the valve to move away from the opening and allow the gases in the reservoir to escape to the atmosphere.

2. The fluid level indicator, as recited in claim 1 wherein said resistance heating means includes:
   a bimetal element attached to said valve means for opening and closing the reservoir as a function of the transmission of voltage to the oil indicator light.

3. A level indicator was claimed in claim 1, wherein the transparent material of the reservoir is a moulded synthetic material, and the measuring tube is integrally moulded with the reservoir.

* * * * *